United States Patent
Cooper

[15] 3,651,634
[45] Mar. 28, 1972

[54] SYSTEMS FOR DISPLAYING VARIOUS PHENOMENA, SUCH AS TIME

[72] Inventor: Sidney Cooper, 49 Knollwood Drive, Cherry Hill, N.J. 08034

[22] Filed: Jan. 7, 1970
[21] Appl. No.: 1,208

[52] U.S. Cl.................................58/50, 58/127, 350/96
[51] Int. Cl.............................................G04b 19/34
[58] Field of Search.....................58/23, 5, 0, 127; 350/96

[56] References Cited

UNITED STATES PATENTS 3,566,602   3/1971   Bergey et al...............................58/50

Primary Examiner—Richard B. Wilkinson
Assistant Examiner—Edith C. Simmons
Attorney—Morton C. Jacobs

[57] ABSTRACT

Many instruments have been employed for indicating different phenomena by mechanical means, as in a clock wherein time is conventionally designated by the movement of hands over time representing digits arranged circumferentially in an endless, circular array, or by means of a rotary drum bearing similar indicia in endless formation. Instruments of this sort are sometimes difficult to read, especially in the dark. The present invention involves a system for transforming the intelligence thus displayed into one wherein a moving spot of light is made to move linearly along a finite scale having a discrete beginning and a discrete end, thereby facilitating the recognition of the involved phenomena at a glance.

11 Claims, 10 Drawing Figures

Patented March 28, 1972
3,651,634
2 Sheets-Sheet 1
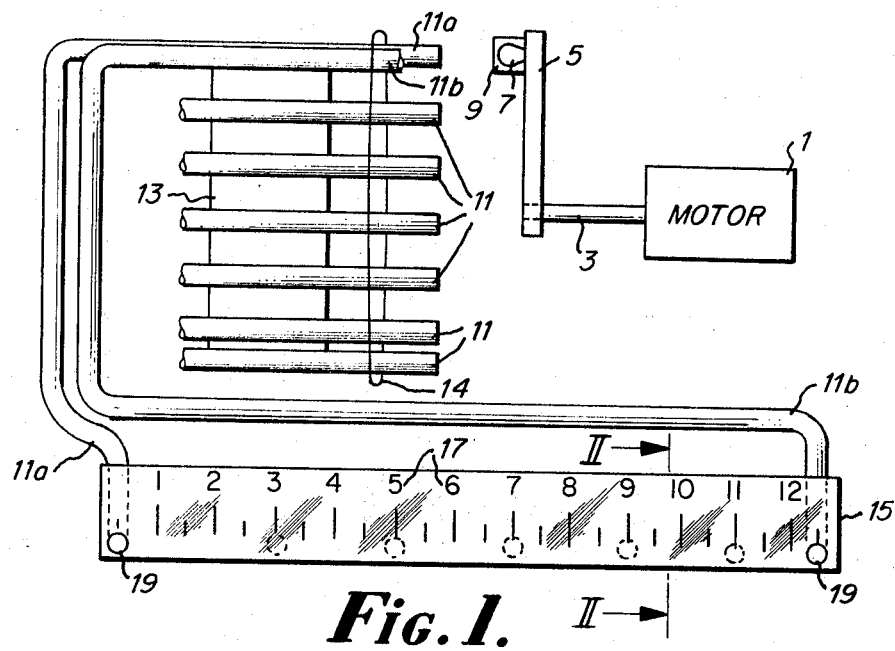
Fig.1.
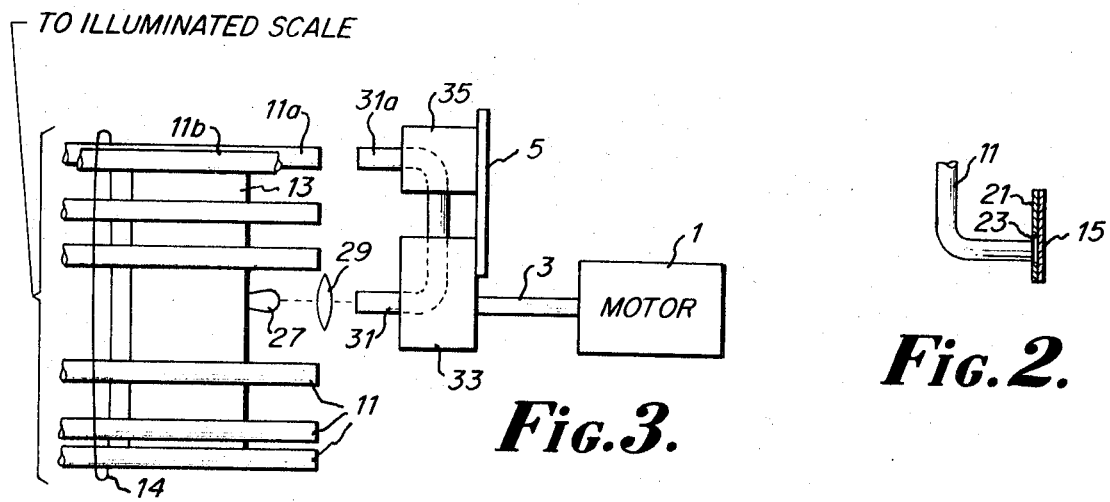
Fig.3.
Fig.2.
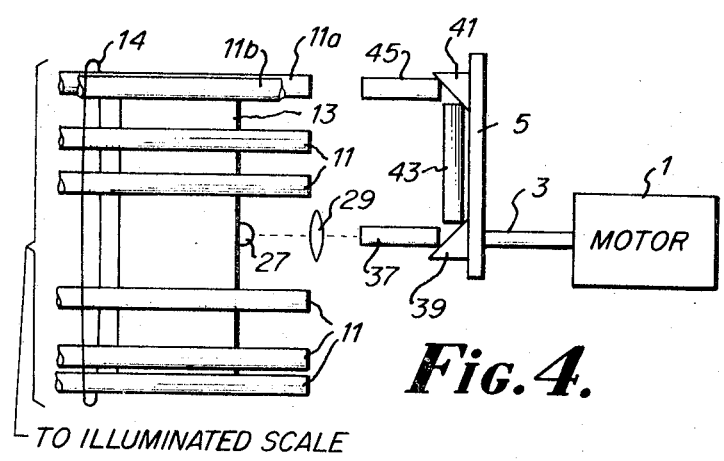
Fig.4.
INVENTOR.
Sidney Cooper
BY Morris Kablin
ATTORNEY Patented March 28, 1972 3,651,634

INVENTOR.
Sidney Cooper
BY
ATTORNEY

SYSTEMS FOR DISPLAYING VARIOUS PHENOMENA, SUCH AS TIME

This invention relates to systems for indicating phenomena, such as time or the like, in a manner to assure facile recognition thereof, especially in the dark.

The primary object of this invention is to provide systems of the type mentioned above which can be used with conventional clock motors or the like with only a simple change therein.

More particularly, it is an object of this invention to provide a novel system of this type which will provide a highly concentrated spot of light so that its location on the scale can be readily spotted.

Another object of the present invention is to provide a novel system as aforesaid which can use a small light bulb as a light source and which will transmit a beam therefrom with minimum light loss.

Still another object of this invention is to provide an improved system as above set forth in which the phenomena indicating scale can be read easily and quickly.

A further object of this invention is to provide, for use in apparatus capable of indicating phenomena in various units (such as time, for example), one or more scales suitable to indicate such units instantaneously.

It is also an object of this invention to provide a novel system of the type set forth which is simple in construction, easy to manufacture, and highly efficient in use.

SUMMARY OF THE INVENTION

According to the present invention, in the case of a clock (to which this description is primarily directed by way of example), the various units of time may be shown on a single, finite linear scale across which a spot of light can be made to move to indicate the precise time of day, whether the time scale is disposed in a lighted environment or whether it is disposed in a completely dark environment. To accomplish this, use may be made of a conventional clock motor having a rotary shaft which normally carries the clock hands that move circumferentially over an endless circular array of time indicating indicia. However, instead of providing the shaft with such hands, there is provided, according to the present invention, a source of light in association with such shaft for providing a beam of light that rotates with the shaft. This light beam is directed to the receiving or inlet ends of a bundle of light transmitting pipes the light emitting ends of which terminate adjacent a scale more or less remote from the shaft, the scale having one or more sets of time indicating indicia arranged linearly thereon in a finite array. As the shaft rotates, the light beam moves with it across the inlet ends of the pipes of a bundle of optical pipes which transmit the light to and project it onto the scale as their inlet ends are scanned by the rotating beam. One need only to take a brief, hasty look at the scale to note the position of the projected light spot thereon at any instant and thus tell the time of day, either in daytime or at night when it is dark.

The various units of time (i.e., hours, minutes and seconds) may be shown by the same set of indicia on a single scale, or they may be delineated on three different, physically separated scales, as desired. Such scales can be linear or non-linear in a straight line that may be horizontal, vertical, or a mixture of both. Similarly, the indicia can be disposed along a finite arc, either in a common plane, or in different planes, or they can be arranged in curved geometric fashion, as along the surface of a cylinder, a sphere, or the like. Each scale of the clock can be different in size and shape from the others. If desired, the various time indications may be made of different colors to more readily distinguish between them, or they can be made to change colors in the course of a day. Furthermore, the material of the clock "face" may be of any opaque, transparent, or translucent material.

BRIEF DESCRIPTION OF THE DRAWINGS

The novel features of this invention, both as to its structure and method of operation, as well as additional objects and advantages thereof, will be understood more readily from the following description, when read in connection with the accompanying drawings in which FIG. 1 is a diagrammatic view of one intelligence transmitting system according to the present invention, FIG. 2 is a fragmentary, sectional view of a somewhat modified form of the scale of FIG. 1 taken approximately along the line II—II and looking in the direction of the appended arrows, FIG. 3 is a fragmentary view of a modified form of the invention of FIG. 1, FIG. 4 is a similar, fragmentary view of another modified form of the invention of FIG. 1, and FIGS. 5 to 10 are views showing various forms of time designating scales useful in systems according to this invention.

DESCRIPTION OF THE PREFERRED EMBODIMENT

Figure 5:
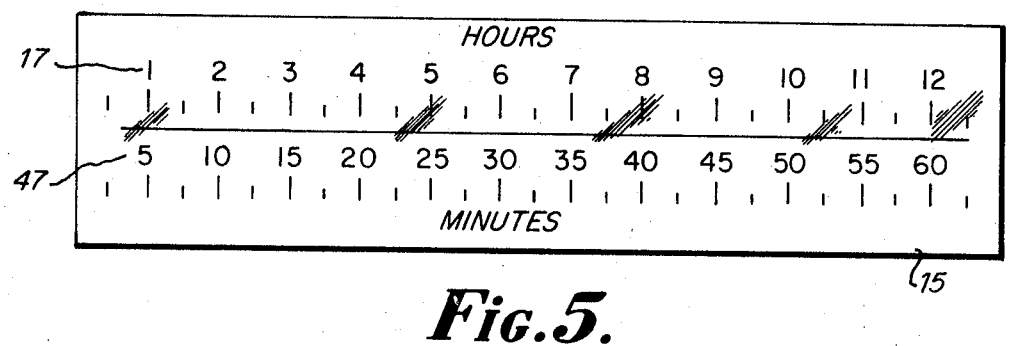

Referring more particular to FIG. 1, there is shown a motor 1 which may be a clock motor, for example, either mechanical or electrical, and which has a shaft 3 extending therefrom. Secured to the shaft 3 is an outwardly extending arm 5 on which is mounted a bulb or light source 7 within a shield 9. Electrical energy may be supplied to the bulb 7 in any suitable way, as by means of slip rings. As the shaft 3 rotates through 360°, it carries the arm 5 and the bulb 7 with it through a 360° arc similarly to the hands of a conventional clock.

Disposed in a similar arc in a plane in close proximity to the plane in which the bulb 7 moves are the light receiving or input ends of a bundle of individual optical light pipes 11 mounted on the surface of a supporting drum 13. The pipes 11, arranged in a bundle as represented by the loop 14 around them, may be optical fibers, rods, bands, or strips, all of known form, and having the characteristic of transmitting therealong to their output ends substantially all the light received thereby at their respective input ends. These pipes may or may not be arranged contiguously, as circumstances dictate, but in the case of a clock, at least two of the pipes 11a and 11b should be contiguous to each other for a reason that is explained below.

Located more or less remote from the shaft 3 is a scale 15 having time indicating markings or indicia 17 thereon arranged rectilinearly in a finite array with a definite beginning and a definite end in contrast to the endless array of indicia on conventional clock faces. Each of the pipes 11 terminates at its output end immediately behind the scale 15, as best seen in FIGS. 1 and 2, to project a spot of light 19 thereon. The scale 15 may be made of any suitable transparent or translucent material and may be of any color. If it is transparent, an opaque shield 21 may be placed therebehind, as seen in FIG. 2, and the light emitting ends of the respective pipes 11 may be disposed in a slot 23 in the shield 21. Thus, a clear spot of light will appear on the scale 15 opposite the appropriate marking 17 corresponding to the time of day involved. On the scale 15 of FIG. 1, the hour markings are designated by the full lines "1," "2,"–"12," and the half hours are designated by the short lines between each adjacent pair of full lines. Now, it will be noticed that one of these short lines appears in advance (i.e., to the left) of the full line designating the "1" o'clock marking, while another short line appears after (i.e., to the right of) the "12" o'clock marking. Actually, both of these short lines are, in effect, the same to represent one-half after "12" or one-half hour before "1." For this reason, the spot of light 19 showing the indicated half hour time should appear simultaneously on both of the short lines under consideration. To achieve this, the two pipes 11a and 11b are arranged contiguously to each other at their input ends with one pipe terminating at one of the mentioned short marks and the other one terminating at the other short mark. One way to achieve this contiguous relationship is to superimpose the two light pipes 11a and 11b, although just placing them side by side and cementing them in place on the drum 13 is another possibility. In any case, with such a contiguous relationship of the pipes 11a and 11b, the bulb 7 will illuminate the input ends of each of the pipes 11a and 11b concurrently whereby a light spot 19 will be seen at the same time at each of the short lines in question. The output ends of the other pipes 11 may be distributed linearly along the scale 15, each terminating at the appropriate time marking 17 to which it relates. Hence, there will be a continuously advancing spot of light along the scale 15 as time progresses, and this spot can be clearly discerned whether the scale 15 is in a lighted environment or in a dark one.

The intelligence transmitting system of FIG. 3 is essentially similar to that of FIG. 1. However, instead of employing a rotating light source, as in FIG. 1, the system of FIG. 2 has a fixed light source 27 the light from which is focused by a lens 29 onto the input end of a U-shaped optical light pipe 31 mounted on a pair of blocks 33, 35. The block 33 is fixed to the shaft 3 of the motor 1. The arm 5 in this case is secured to the block 33, and the block 35 is secured to the arm 5. Thus, the arm 5 and the blocks 33 and 35 rotate as a unit with the motor shaft 3. The blocks 33 and 35 may be formed with channels into which the pipe 31 fits. Preferably, the bulb 27, the lens 29, and the shaft 3 are so arranged that they are on a common axis, and the upper part 31a of the light pipe 31 is at the same radial distance from the axis of the shaft 3 as is the bulb 7 of FIG. 1. Consequently, as the shaft 3 rotates, it causes the light emitting end of the upper arm 31a to rotate in an arc to scan the proximate light intake ends of the bundle of light pipes mounted on the drum support 13. As in FIG. 1, the light emitting ends of the pipes of the aforesaid bundle terminate adjacent to and along a lineal scale to provide a moving spot of light therealong.

In FIG. 4, there is shown a system generally similar to that of FIG. 3. The system of FIG. 4 also has an arm 5 secured to the shaft 3 of the motor 1, but here, the arm extends from the shaft in opposite directions, or diametrically therefrom. As in FIG. 3, the light source 27 is fixed and emits light which is focused on a first, horizontal optical pipe 37 by the lens 29. Once again, the bulb 27, the lens 29, and the pipe 37 are preferably on a common axis. Mounted on the arm 5 in vertically spaced relation are a pair of prisms 39 and 41 between which is a vertical optical pipe 43. A third, horizontal optical pipe 45 extends from near the prism 41 toward the inlet end of the light pipes 11 of the aforesaid bundle of light pipes. Light from the lamp 27 is projected to the inlet end of the pipe 37 which transmits the light to the prism 39. In turn, the prism 39 deflects the light up through the vertical pipe 43 which emits the transmitted light to the prism 41. Finally, the prism 41 deflects the light on through the pipe 45, and light emitted by the pipe 45 is projected successively to the inlet ends of the aforesaid bundle of pipes 11 as the arm 5 rotates.

The scale of FIG. 1 has its markings 17 arranged in a straight-line linear array to indicate hours. It is also possible to arrange a similar scale to designate both hours and minutes, as shown in FIG. 5, for example. Here, the hours designating markings 17 and the minutes designating markings 47 are both arranged horizontally in a common plane.

Figure 6:
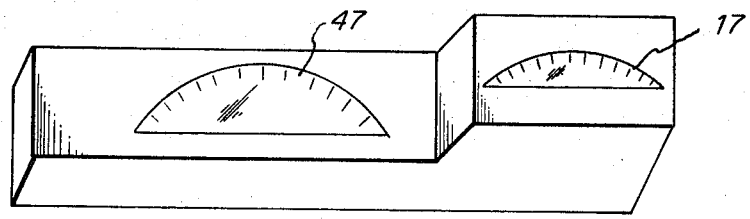

FIG. 6 also shows a pair of scales, one for hours and the other for minutes. Both scales are arranged in curvilinear form, but, as in the case of the scales described heretofore, each has a discrete beginning and a discrete end. The two scales 17 and 47 are disposed in different planes.

Figure 7:
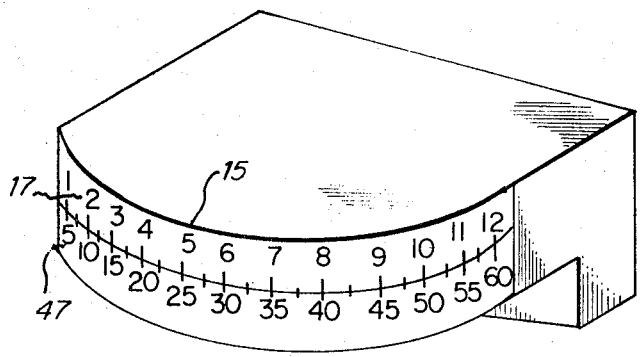

In FIG. 7, the surface on which the scale 15 is formed is cylindrical, but it could be part of a sphere or an ellipsoid. In fact, it could have any desired geometrical or irregular shape, as desired. In each case, a light transmitting system similar to those described above could be used to project a moving light spot along the scale.

Figure 8:
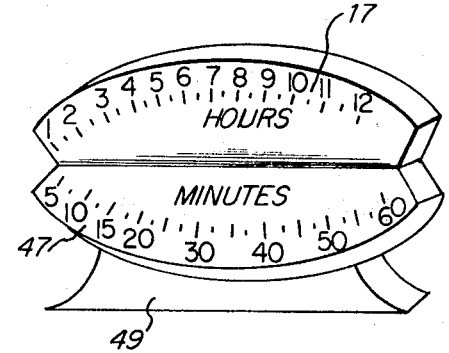

FIG. 8 shows another geometrical arrangement in which the hours and the minutes scales are laid out, the scales being mounted on a base 49.

Figure 9:
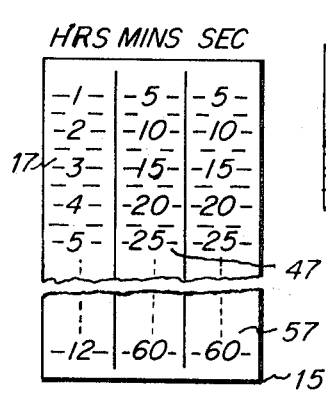

FIG. 9 shows another layout of scales, one scale 17 for hours, one scale 47 for minutes, and a third scale 57 for seconds. These three scales are also of finite length and are arranged vertically.

Figure 10:
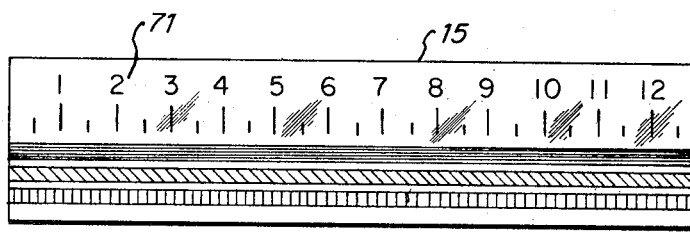

Finally, in FIG. 10, there is shown a finite, rectilinear scale 71 having hour and half hour markings arranged horizontally and also one or more bars 73, each preferably of a different color. Thus, the topmost bar may be blue, the intermediate one may be green, and the lowermost one may be red. As the light spot moves along the scale and/or the bars 73, its location and significance can be noted quickly and easily.

From the foregoing description, it will be apparent that there have been provided novel time indicating systems of a variety of forms. Each of these systems and their respective scales makes it possible to avoid parallax, as in conventional clocks employing hour and minute hands, for example. In each case, different colored strips and/or bars can be used to distinguish between A.M. and P.M., or to distinguish between the various units of time or other phenomena involved. Moreover, because the particular time or the like which is involved is clearly indicated by the position of a light spot, it can be discerned readily whether the scale is located in a lighted environment or in the dark. It should also be apparent that the scale may be illuminated from the front as well as from the rear, as in the systems described above. Instead of using cylindrical rods 11 to form a round light spot, flat or ribbon-like pipes may be used to form a relatively thin light spot or line of light on the scale. Other changes and modifications of like nature, all within the scope of the present invention, will undoubtedly suggest themselves to those skilled in the art, as well as application of the invention in fields other than clocks, as in galvanometers, voltmeters, ammeters, radar displays, etc. It is desired, therefore, that the foregoing shall be construed as merely illustrative, and not in a limiting sense.

What is claimed is:

1. A system for transmitting intelligence normally displayed on one type of scale arranged in a first array to a display thereof on a different type of scale arranged in a different, second array, said system comprising
   a. a clock mechanism having as a part thereof a shaft rotatable through a 360° arc,
   b. light beam providing means associated with said shaft and rotatable therewith,
   c. a bundle of light conveying pipes associated with said light beam providing means, the individual pipes of said bundle each having an input end and an output end and having their said input ends arranged in said first array to successively receive light from said light beam providing means as said latter means rotates in response to said shaft, said pipes having their respective output ends disposed in said second array, and
   d. scale means displaced from said shaft having markings divided in units of time and disposed in said second array for indicating said intelligence, said pipe output ends being disposed adjacent to said scale means for producing illumination in association with said markings progressively as said light beam providing means rotates in response to its said shaft.

2. A system according to claim 1 wherein said shaft has an arm extending therefrom and wherein said light beam providing means comprises a light bulb carried by said arm in a position to scan the input end of each pipe of said bundle in succession.

3. A system for transmitting intelligence normally displayed on one type of scale arranged in a first array to a display thereof on a different type of scale arranged in a different, second array, said system comprising
   a. a shaft rotatable through a 360° arc,
   b. light beam providing means associated with said shaft and rotatable therewith,
   c. a bundle of light conveying pipes associated with said light beam providing means, the individual pipes of said bundle each having an input end and an output end and having their said input ends arranged in said first array to successively receive light from said light beam providing means as said latter means rotates in response to said shaft, said pipes having their respective output ends disposed in said second array, and d. scale means displaced from said shaft having markings disposed in said second array for indicating said intelligence, said pipe output ends being disposed adjacent to said scale means for producing illumination in association with said markings progressively as said light beam providing means rotates in response to its said shaft, said shaft having an arm extending therefrom and said light beam providing means comprising a fixed source of light and optical light pipe means mounted on said arm for rotation therewith, said pipe means having a first portion thereof with a light input end disposed to receive light from said source and a second portion thereof with a light output end terminating opposite the input end of one or another of the pipes of said bundle as said shaft and its said arm rotate whereby said last named output end will successively scan the pipe input ends of said bundle as said shaft rotates.

4. A system according to claim 3 wherein said linear scale means has said markings arranged rectilinearly thereon in finite length.

5. A system according to claim 3 wherein said linear scale means has said markings arranged curvilinearly thereon in finite length.

6. A system according to claim 3 wherein said linear scale means comprises a plurality of sets of a scale markings, each of finite length and each designating different units of a given phenomenon.

7. A system according to claim 1 wherein said scale means comprises three discrete sets of scale markings, one set indicating hours, one set indicating minutes, and the third set indicating seconds.

8. A system according to claim 1 wherein at least two of said bundle of light conveying pipes are contiguous to each other whereby said two pipes can be simultaneously illuminated by the light emitted by said light beam providing means.

9. A system according to claim 3, wherein said optical light pipe means includes a third portion disposed angularly to said first portion, a first prism between first and third portions for receiving light emitted thereto by said first portion and directing it to the input end of said third portion, said portion being disposed angularly to said third portion, and a second prism disposed between said third and second portions to receive light emitted by said third portion and directed to the input end of said second portion.

10. A system according to claim 3 wherein said first source of light is at the axis of rotation of said light pipe means, and said first portion of the light pipe means has the light input end thereof disposed along said axis of rotation.

11. In a time clock, a display system comprising
a. means for developing time information in a cyclic pattern, and for producing light varying in accordance with said pattern,
b. scale means displaced from said information developing and light producing means having sets of scale markings for indicating hours and minutes arranged in open ended formats,
c. and a bundle of light conveying pipes associated at input ends thereof with said light producing means and arranged thereat in a first array in accordance with said cyclic pattern, and associated at output ends thereof with said scale markings and arranged thereat in a second array in accordance with said open ended formats.

* * * * *